United States Patent
Bridgeford et al.

(10) Patent No.: US 10,100,933 B2
(45) Date of Patent: Oct. 16, 2018

(54) AUTO STOP FLUID VALVE

(75) Inventors: Brandon Bridgeford, Mira Loma, CA (US); David Young, Rancho Cucamonga, CA (US); Ron Hahn, Yorba Linda, CA (US)

(73) Assignee: Acom Engineering Company, City of Industry, CA (US)

( * ) Notice: Subject to any disclaimer, the term of this patent is extended or adjusted under 35 U.S.C. 154(b) by 460 days.

(21) Appl. No.: 13/507,454

(22) Filed: Jun. 29, 2012

(65) Prior Publication Data
US 2014/0001279 A1    Jan. 2, 2014

(51) Int. Cl.
| F16K 1/02 | (2006.01) |
| F16K 1/00 | (2006.01) |
| E03B 7/07 | (2006.01) |

(52) U.S. Cl.
CPC .................. *F16K 1/00* (2013.01); *F16K 1/02* (2013.01); *E03B 7/074* (2013.01); *E03C 2201/40* (2013.01)

(58) Field of Classification Search
CPC . F16K 1/50; F16K 27/08; F16K 1/002; F16K 1/02; B05B 17/08; A47G 21/188; E03B 9/20; E03B 7/074; E03B 2001/40; B01D 35/02; B01D 35/04; B01D 35/157; B01D 35/1573; B01D 35/30; B01D 29/88; B01D 29/90; B01D 29/92; B01D 29/96; B01D 2201/16; B01D 2201/167; B01D 2201/30; B01D 2201/301; B01D 2201/302; C02F 2301/04; C02F 2307/06; B67D 7/76; B67D 7/766

USPC ..... 239/24, 29, 32, 569, 575, 580, 232, 234, 239/235, 435, 16, 25, 26; 251/274, 264; 137/549

See application file for complete search history.

(56) References Cited

U.S. PATENT DOCUMENTS

| 1,407,763 | A | | 2/1922 | Langston | |
| 1,927,582 | A | * | 9/1933 | Denk | B01D 35/153 137/533.15 |
| 2,945,591 | A | | 7/1960 | Pall | |
| 4,310,142 | A | * | 1/1982 | Ludwig | 251/30.03 |
| 4,329,941 | A | * | 5/1982 | Niki | 119/72.5 |
| 4,439,984 | A | * | 4/1984 | Martin | 60/454 |
| 4,537,350 | A | * | 8/1985 | Apri | 239/25 |
| 5,611,923 | A | | 3/1997 | Suri et al. | |
| 6,899,125 | B2 | * | 5/2005 | Ellero | G05D 16/0663 137/505.42 |
| 6,941,893 | B2 | * | 9/2005 | Gabriel et al. | 119/72.5 |
| 7,077,153 | B2 | * | 7/2006 | Segien, Jr. | 137/119.01 |
| 7,090,144 | B2 | * | 8/2006 | Gross et al. | 239/26 |
| 2006/0000754 | A1 | | 1/2006 | Kang et al. | |

(Continued)

*Primary Examiner* — Alexander Valvis
*Assistant Examiner* — Christopher R Dandridge
(74) *Attorney, Agent, or Firm* — Eric J. Sosenko; Jonathan P. O'Brien; Honigman Miller Schwartz and Cohn LLP

(57) ABSTRACT

An embodiment includes a valve with a filter in which the flow of water through the valve is stopped by lowering a filter within the valve. This movement of the filter allows a poppet valve to close, stopping the flow of water. Subsequent raising of the filter holds the poppet valve in the open position, allowing the flow of water through the filter for further use. Embodiments are found in drinking fountains and facilitate the maintenance of the drinking fountain by allowing a technician to shut off the water using a screwdriver without requiring the removal of the fountain cover.

20 Claims, 4 Drawing Sheets

(56) References Cited

U.S. PATENT DOCUMENTS

| | | | |
|---|---|---|---|
| 2007/0246567 A1* | 10/2007 | Roberts | B05B 1/3006 |
| | | | 239/200 |
| 2010/0170841 A1* | 7/2010 | An | B01D 35/147 |
| | | | 210/234 |
| 2011/0024344 A1 | 2/2011 | Thomas et al. | |
| 2011/0162734 A1* | 7/2011 | Colussi | F16K 11/105 |
| | | | 137/544 |

\* cited by examiner

AUTO STOP FLUID VALVE

BACKGROUND OF THE INVENTION

Field of the Invention

Embodiments may be found in the field of liquid valves with repair or assembling means.

Description of Related Art Including Information Disclosed Under 37 CFR 1.97 and 1.98

U.S. Pat. No. 1,407,763 discloses a system in which two poppet valves are held open when a filter is in place. When a filter lid is lifted by a handle, the poppet valves close.

U.S. Pat. No. 2,945,591 discloses a filter in which a poppet valve sleeve moves, thereby closing the poppet valve when the bowl which retains the filter in place is unscrewed.

U.S. Pat. No. 5,611,923 discloses an assembly with an annular engaging member or ring which activates the inlet and outlet poppet valves. The filter element is contained in a bowl and an outer sleeve is rotated to close and open the valves.

U.S. Pat. Applic. Pub. No. 2006/0000754 discloses a water purifier in which poppet valves are closed when filters are removed and opened when filters are installed.

U.S. Pat. Applic. Pub. No 2011/0024344 discloses a poppet valve which is normally closed and sealed and is displaced to an open position by a pin at the upper end of a filter.

The foregoing examples of the related art and limitations related therewith are intended to be illustrative and not exclusive. Other limitations of the related art will become apparent to those of skill in the art upon a reading of the specification and a study of the drawings.

The discovered art does not disclose liquid valves with the advantages of embodiments of the present disclosure, that of a liquid valve which, when installed in a fountain, can interrupt the liquid flow without removal of the fountain body cover.

BRIEF SUMMARY OF THE INVENTION

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Embodiments include an auto stop fluid valve which comprises an inlet body having an inlet port and a valve chamber and a poppet valve located in the valve chamber. The poppet valve being capable of movement between open and closed positions. There is a filter body attached to the inlet body, the filter body having a filter chamber and a cylindrical filter located within the filter chamber. The filter having a raised and a lowered position, the filter having a first and a second end, the second end of the filter is in contact with the poppet valve and holds the poppet valve in the open position when the filter is in the raised position, the poppet valve moving to the closed position when the filter is in the lowered position or removed. The filter is secured within the filter chamber by a removable cap which seals the bottom of the filter chamber, the cap is in contact with the first end of the filter, the cap having a raised and a lowered position or may be removed, the cap moving the filter to the upper position when the cap is in the raised position, and the filter is moved to the lower position when the cap is in the lower position or removed. A fluid control chamber body having a fluid control chamber, a fluid control chamber outlet port, and a valve outlet port is attached to and in fluid communication with the filter chamber.

BRIEF DESCRIPTION OF THE SEVERAL VIEWS OF THE DRAWING(S)

DETAILED DESCRIPTION OF THE INVENTION

Figure 1:
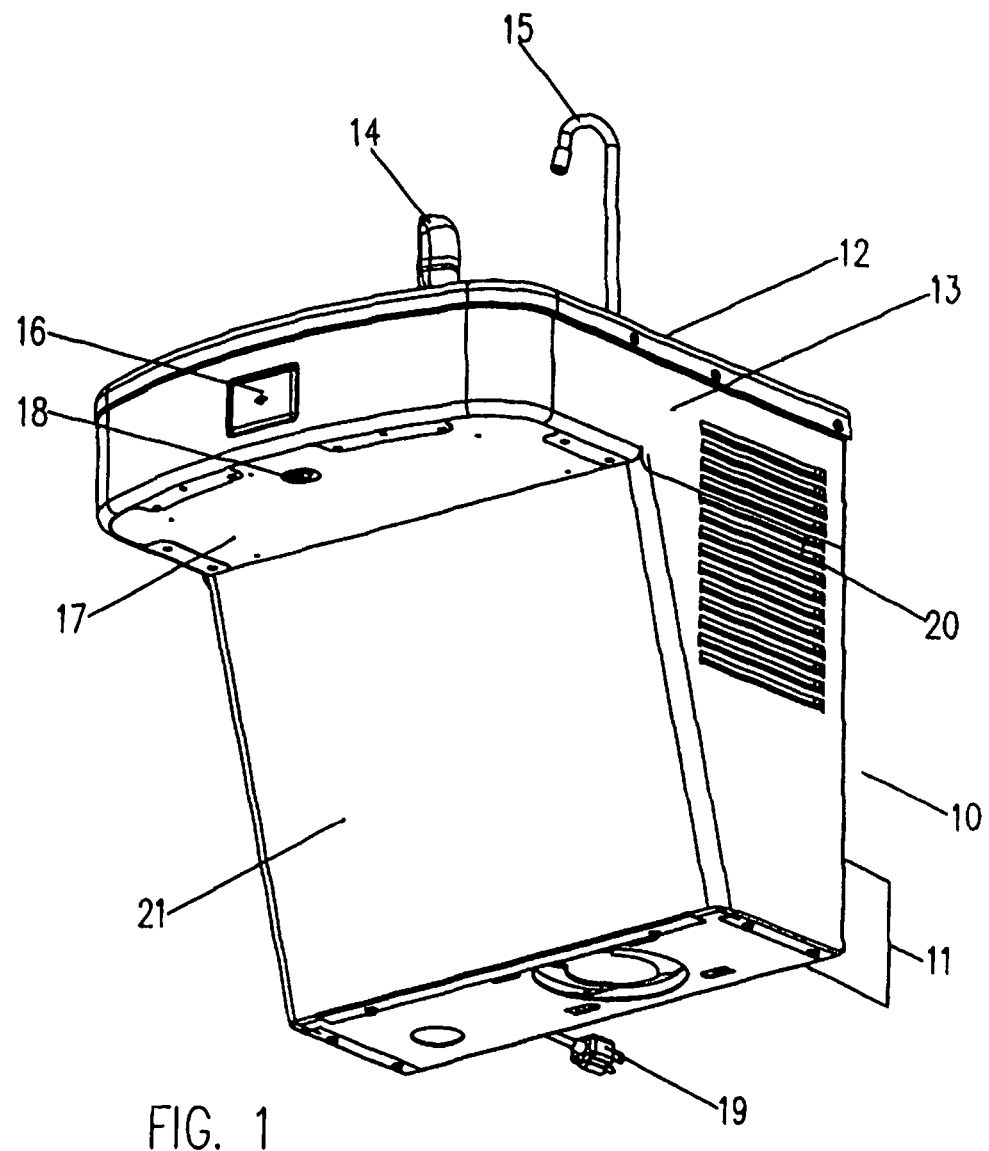
FIG. 1 is a perspective view of an embodiment drinking fountain having an auto stop fluid valve.

FIG. 1 is a perspective view of an embodiment drinking fountain 10 having an auto stop fluid valve. Visible in FIG. 1 is a drinking fountain body 11 with a basin extension 13 extending from the body. A basin 12 is at the top of the body and basin extension 13. A bubbler 14 and a spigot 15 are visible extending above the basin 12. A control button 16 is on the front of the basin extension 13. The body is covered by a cover 21. An access hole 18 is located on the underside of the basin extension 17. Access hole 18 allows access to an auto stop fluid valve (not shown in FIG. 1) without requiring removal of the cover 21. Louvers 20 for the cooling mechanism and an electrical cord 19 also are visible in FIG. 1.

Figure 2:
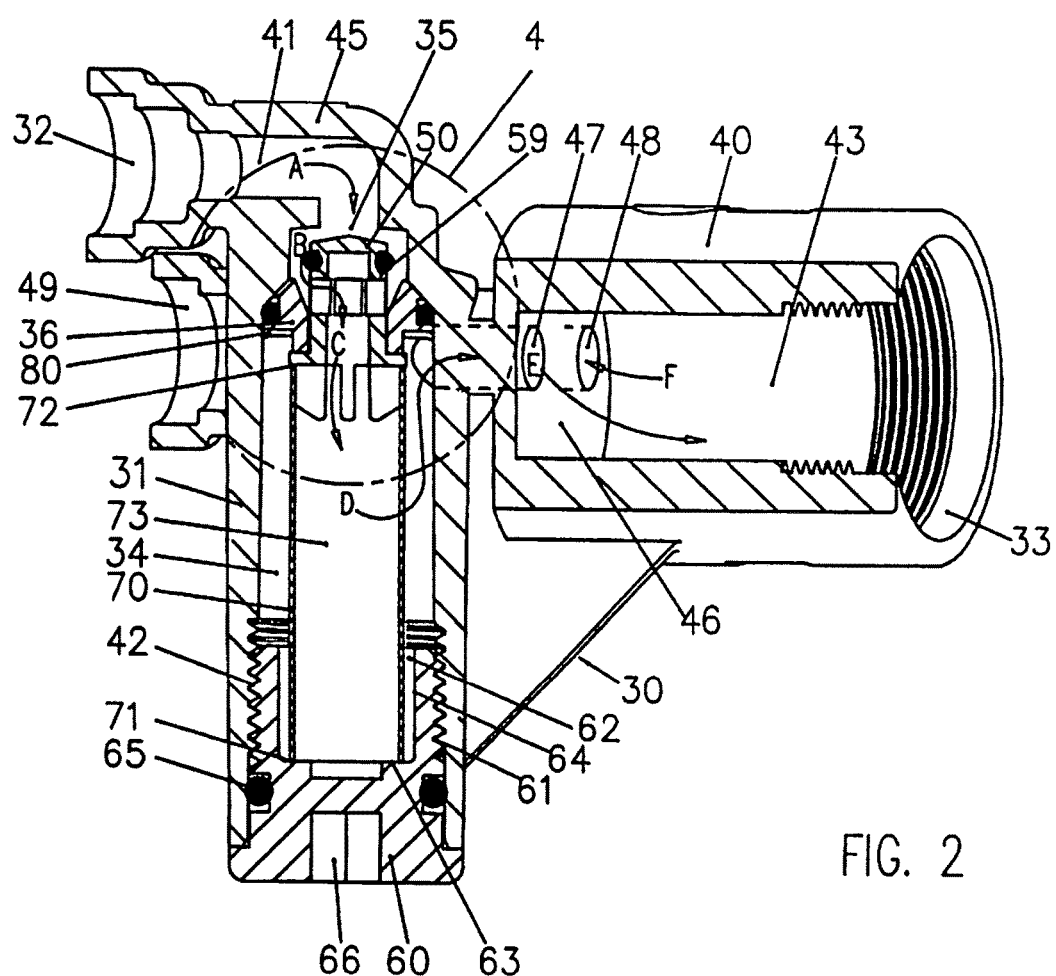
FIG. 2 is a partial cross-section of an embodiment auto stop fluid valve in the open position.

FIG. 2 is a partial cross-section of an embodiment auto stop fluid valve 30 in the open position. Visible in FIG. 2 is the inlet body 45 which comprises an inlet port 32, an inlet chamber 41, and a valve chamber 35. The inlet port 32 connects with a fluid or, in some embodiments such as drinking fountains, water supply. A poppet valve 59 is located between the inlet body 45 and the filter body 31 and allows passage of fluid from the inlet body to the filter body when in the open position (as in FIGS. 2 and 4) and blocks such passage when in the closed position (as in FIGS. 3 and 5). The poppet valve 59 is comprised of a poppet 50 and a retainer seat 36. Circle 4 is shown in greater detail in FIG. 4.

A filter body 31 is attached to the inlet body 45. The filter body 31 comprises a filter chamber 34 and a filter cap 60. The filter cap 60 with a cap O-ring 65 is attached to and seals the bottom of the filter chamber 34 by cap threads 61 which interact with filter chamber threads 42. The filter cap comprises a cap cavity 62 with a cavity bottom 63 and cavity side 64. A slot 66 in the outside of the cap 60 interacts with and allows the rotation of the cap by a tool, such as a screwdriver or a vandal-resistant wrench. The fluid control chamber inlet port 47 provides fluid communication from the filter chamber 34 through the fluid control chamber wall 46 to the fluid control chamber 43.

A cylindrical filter 70 which has a second end 72 and a first end 71 is located in the filter chamber 34. The second end 72 of the filter is in contact with the poppet 50. The first end 71 of the filter is in contact with the cap cavity bottom 63.

A fluid control chamber body 40 is in fluid communication with the filter chamber 34 via fluid control chamber inlet port 47 through the fluid control chamber wall 46. The fluid control chamber body 40 comprises fluid control chamber 43, a fluid control chamber closure port 33, and a fluid control chamber outlet port 48 through the fluid control chamber wall 46. The fluid control chamber outlet port 48 is in fluid communication with the valve outlet port 49. The valve outlet port 49 is connected to conduits for further use of the fluid, in embodiments, water. The fluid control chamber closure port 33 is normally closed by a threaded plug (not shown in FIG. 2).

FIG. 2 shows the auto stop fluid valve 30 in the open position in which fluid flows through the valve from the valve inlet port 32 to the valve outlet port 49. In this open position the cap 60 is in the upper position, as is the second end 72 of the filter 70 which bears upon and moves the poppet 50 in the poppet valve assembly 59 to the upper or open position. Arrows A-F depict the flow of fluid through the auto stop fluid valve. Fluid enters the valve inlet port 32 and enters the valve inlet chamber 35 as shown by arrow A. Arrow B shows the passage of fluid through the poppet 50 and arrow C shows the entry of fluid into the interior 73 of the filter 70. Arrow D depicts movement of the fluid through the filter 70 into the filter chamber 34. Arrows E show movement of the fluid from the filter chamber 34 into the fluid control chamber 43, from which the fluid flows through the fluid control chamber outlet port 48 as depicted by arrow F, to the valve outlet port 49 for further use.

Figure 3:
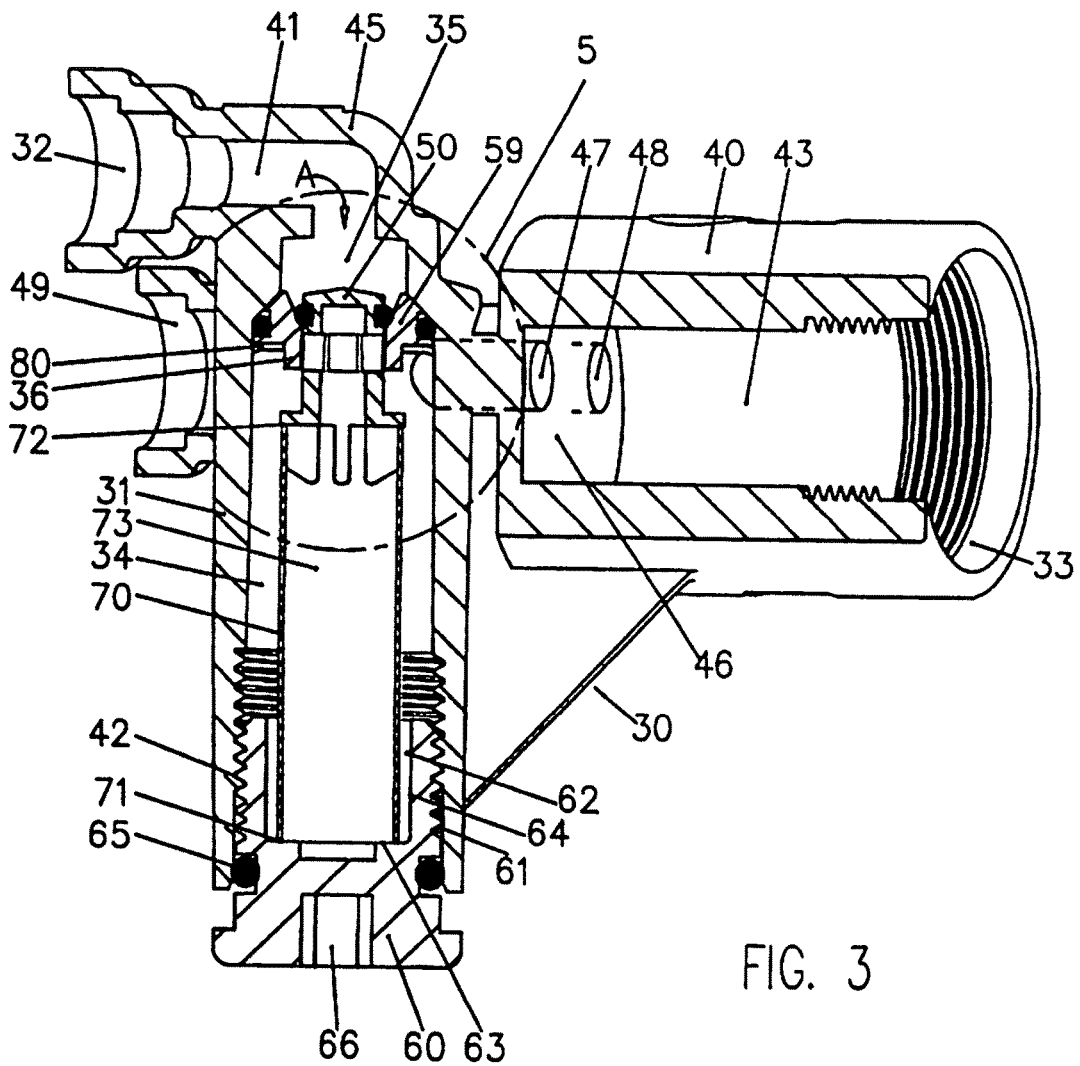
FIG. 3 is a partial cross-section of an embodiment auto stop fluid valve in the closed position.

FIG. 3 is a partial cross-section of an embodiment auto stop fluid valve 30 in the closed position. In this position the flow of fluid (shown by Arrow A) is stopped by the closed poppet valve assembly 59 at the valve chamber 35 and does not flow through the filter 70 or out of the auto stop fluid valve. The elements of FIG. 3 are the same as FIG. 1 with the exception of the position of the cap 60, filter 70 and poppet 50. Circle 5 is shown in greater detail in FIG. 5.

In FIG. 3 the cap 60 is in the lower position. In this position the filter 70 is also in the lower position. When the filter 70 is in the lower position, pressure of fluid in the valve chamber 35 forces the poppet 50 into the lower position where it makes a sealing relationship with the poppet retainer seat 36 and blocks flow of fluid through the poppet valve assembly 59. The cap 60 can be removed from the auto stop fluid valve 30 thereby allowing removal of the filter 70 for replacement or cleaning. Of course, removal of cap 60 also allows the poppet valve assembly 59 to close.

Figure 4:
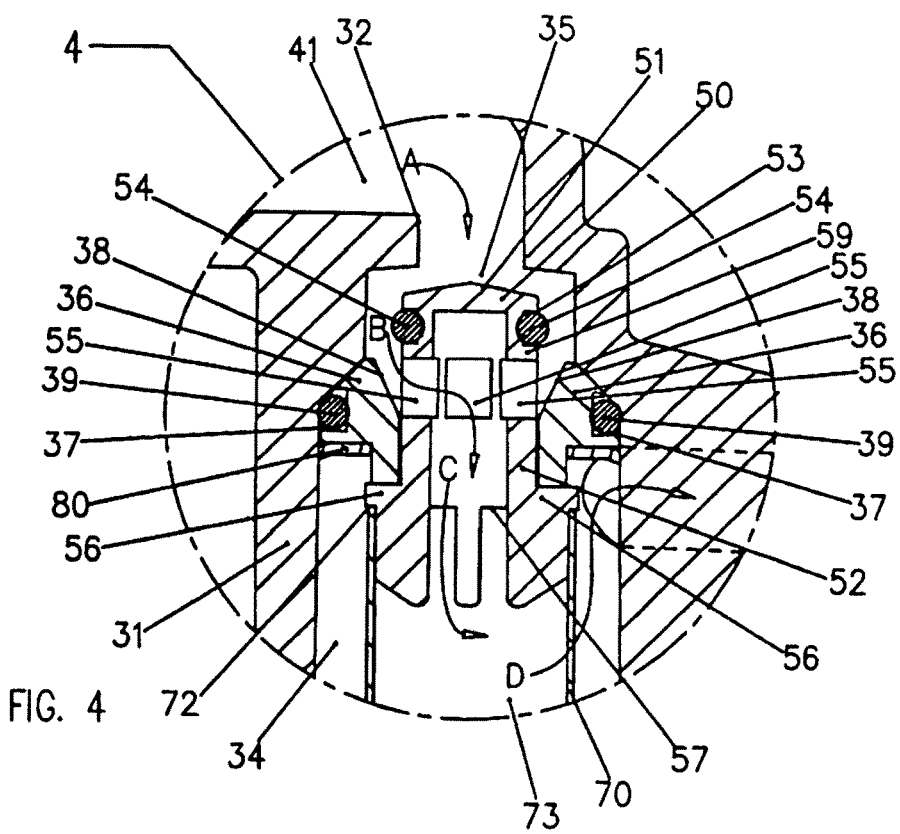
FIG. 4 is an enlarged circle 4 of FIG. 2.

FIG. 4 is an enlarged circle 4 of FIG. 2. Visible in FIG. 4 is the valve inlet port 32 and valve inlet chamber 35 as well as the filter body 31, filter chamber 34, filter 70, interior of filter 73 and second end 72 of filter. Details of the poppet valve assembly 59 in the open position are shown in FIG. 4. The poppet 50 is comprised of a poppet cylinder 52 with a conical head 51 closing one end of the poppet cylinder 52, one or more poppet cylinder flow passages 55 give access to the interior of the poppet cylinder 52, and a poppet cylinder exit port 57 at the bottom of the cylinder allows fluid to flow into the interior 73 of the filter. A poppet cylinder O-ring groove 53 near the conical head 51 accommodates a poppet cylinder O-ring 54. A poppet cylinder shoulder 56 is located about the circumference of the cylinder at the poppet cylinder exit port 57.

The poppet 50 is held in place by a donut-shaped retainer seat 36 attached at the top of the filter chamber 34. The retainer seat 36 has a retainer seat sealing surface 38. The retainer seat 36 has a retainer seat O-ring groove 37 about its circumference which accommodates a retainer seat O-ring 39. Retaining ring 80 secures the poppet valve assembly 59 in place, in the upper end of the filter chamber 34.

The flow of fluid through the poppet 50 and the filter 70 is shown by arrows A-D. Arrow A shows the flow of fluid through the valve inlet chamber 35, arrow B shows the flow through poppet cylinder flow passages 55 in the poppet cylinder 52. Arrow C shows emergence of fluid from the poppet cylinder exit port 57 into the interior 73 of the filter 70. Arrow D shows flow of fluid through the filter 70.

Figure 5:
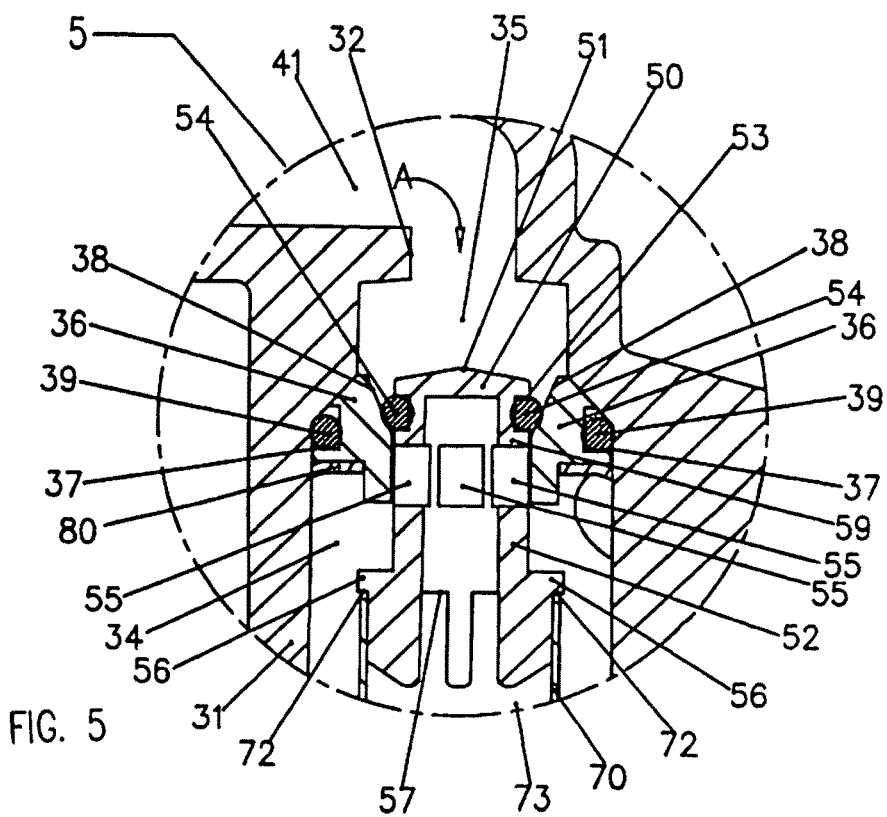
FIG. 5 is an enlarged circle 5 of FIG. 3.

FIG. 5 is an enlarged circle 5 of FIG. 3. In this position the flow of fluid (shown by Arrow A) is stopped at the valve inlet chamber 35 and does not flow through poppet valve assembly 59 or the filter 70. The elements of FIG. 5 are the same as FIG. 4 with the exception of the position of the poppet 50. In FIG. 5 the poppet 50 has been moved by fluid pressure in the valve inlet chamber 35 from the open position shown in FIGS. 2 and 4 to the closed position shown in FIGS. 3 and 5. In the closed position the poppet cylinder flow passages 55 are closed or blocked by contact with the retainer seat 36. The poppet 50 is further sealed by contact of the poppet cylinder O-ring 54 with the retainer seat sealing surface or shoulder 38 of the retainer seat 36. The closing motion of the poppet is made possible by the movement of the second end 72 of the filter to the lower position, which in turn is made possible by the movement of the cap 60 (not shown in FIG. 5) to the lower position.

In embodiments, the inlet body, poppet valve, filter body, and fluid control chamber body are manufactured of suitable strong, non-corrosive impervious material, for example, iron, stainless steel, copper, bronze, brass, aluminum, or plastic.

In embodiments, the filter is woven or manufactured of a suitable strong insoluble, corrosion-resistant, material such as a ceramic, iron, stainless steel, copper, bronze, brass, aluminum, or plastic.

In embodiments, the retaining ring is manufactured of suitable strong, insoluble, corrosion-resistant material, such as stainless steel, copper, bronze, brass or aluminum.

Although embodiments described in this disclosure have emphasized water as a fluid, other fluids such as air, other gasses, organic compounds, and solvents are specifically contemplated. Although this disclosure describes embodiments in which to the flow of fluid is from the valve inlet port through the filter to the fluid control chamber and then to the valve outlet port, embodiments in which the flow of fluid is in the opposite direction, as, for example, in back flushing a filter, are specifically contemplated.

Embodiments of auto stop fluid valves have a number of advantages. For example, maintenance of a water fountain generally begins with the step of turning off the supply of water. This is accomplished in fountains equipped with an auto stop valve by using a screwdriver or a vandal-resistant tool to move the cap from the upper to the lower position, thereby stopping the flow of water into the fountain. Similarly, when a fountain is turned off for any reason, one with a auto stop valve may easily be turned on by moving the cap to the upper position. This is accomplished without the necessity of removing any part of the fountain cover, thereby saving a substantial, often the major, amount of time required for the repair or maintenance of the water fountain. Once the water supply is turned off, the filter and or the fluid control cartridge can be removed and repaired or replaced without further removal of fountain elements.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope. The applicant or applicants have attempted to disclose all the embodiments of the invention that could be reasonably foreseen. There may be unforeseeable insubstantial modifications that remain as equivalents.

We claim:

1. A fluid valve comprising:
   an inlet body having an inlet port and a valve chamber;
   a seat sealingly disposed within the inlet body;
   a poppet valve located in the valve chamber and movable between an open position and a closed position relative to the seat, the poppet valve and the seat preventing a flow of fluid through the poppet valve in the closed position;
   a filter body coupled to the inlet body;
   a filter located within the filter body and including a first end in contact with the poppet valve, a second end disposed on an opposite end of the filter than the first end, and a filter sidewall extending between the first end and the second end, the poppet valve, filter and filter body cooperatively defining a flow path from within the filter to outside of the filter, the filter movable between a raised position and a lowered position relative to the filter body; and
   a cap in contact with the second end of the filter, the cap engaged in a filter body opening of the filter body and being movable between a raised position and a lowered position relative to the filter body, the cap fluidly sealing off a filter body opening in the filter body, and the cap being configured to prevent fluid flow from an outlet of the filter body in the raised position,
   wherein the poppet valve is moved into the closed position in response to a fluid pressure when the filter is in the lowered position and is moved into the open position when the first end of the filter applies a force on the poppet valve.

2. The fluid valve of claim 1, wherein the cap is threadably coupled to the filter body.

3. The fluid valve of claim 1, wherein the first end of the filter is in direct contact with the poppet valve.

4. The fluid valve of claim 1, wherein the cap is movable between an attached state attached to the filter body and a detached state removed from the filter body.

5. The fluid valve of claim 4, wherein the cap is movable between the raised position and the lowered position relative to the filter body when the cap is in the attached state.

6. The fluid valve of claim 4, wherein the filter is hidden from view when the cap is in the attached state.

7. The fluid valve of claim 4, wherein the filter is accessible when the cap is in the detached state.

8. The fluid valve of claim 1, wherein the interior of the filter body is accessible via the filter body opening when the cap is in the detached state.

9. The fluid valve of claim 1, wherein the filter is removable from the filter body at the filter body opening when the cap is in the detached state and the filter body is coupled to the inlet body.

10. The fluid valve of claim 1, further comprising an O-ring sealingly engaging the poppet valve and the seat.

11. The fluid valve of claim 1, further comprising an O-ring sealingly engaging the seat and the inlet body.

12. A fluid valve comprising:
    an inlet body having an inlet port and a valve chamber;
    a seat sealingly disposed within the inlet body;
    a poppet valve located in the valve chamber and movable between an open position and a closed position relative to the seat, in the closed position the poppet valve preventing a flow of fluid through the fluid valve;
    a filter body coupled to the inlet body;
    a cap engaged with the filter body and fluidly sealing off a filter body opening in the filter body, the cap being movably coupled to the filter body and configured to prevent fluid flow from an outlet of the filter body; and
    a filter located within the filter body, the poppet valve, filter and filter body defining a flowpath from within the filter to outside of the filter, and including a first end in contact with the poppet valve and a second end in contact with the cap, the filter movable between a raised position and a lowered position relative to the filter body in response to the cap being moved relative to the filter body.

13. The fluid valve of claim 12, wherein the poppet valve moves to the closed position in response to a fluid pressure when the filter is in the lowered position and moves to the open position when the filter is in the raised position.

14. The fluid valve of claim 12, wherein the first end of the filter is in direct contact with the poppet valve.

15. The fluid valve of claim 12, wherein the cap is movable between an attached state attached to the filter body and a detached state removed from the filter body.

16. The fluid valve of claim 15, wherein the cap is movable between the raised position and the lowered position relative to the filter body when the cap is in the attached state.

17. The fluid valve of claim 15, wherein the filter is hidden from view when the cap is in the attached state.

18. The fluid valve of claim 15, wherein the filter is accessible when the cap is in the detached state.

19. The fluid valve of claim 12, wherein the interior of the filter body is accessible via the filter body opening when the cap is in the detached state.

20. The fluid valve of claim 12, wherein the filter is removable from the filter body at the filter body opening when the cap is in the detached state and the filter body is coupled to the inlet body.

* * * * *

UNITED STATES PATENT AND TRADEMARK OFFICE
CERTIFICATE OF CORRECTION

PATENT NO. : 10,100,933 B2
APPLICATION NO. : 13/507454
DATED : October 16, 2018
INVENTOR(S) : Brandon Bridgeford et al.

Page 1 of 1

It is certified that error appears in the above-identified patent and that said Letters Patent is hereby corrected as shown below:

On the Title Page

Item (73) incorrectly lists the Assignee as "Acom Engineering Company.".
The Assignee should read --Acorn Engineering Company--.

Signed and Sealed this
Thirteenth Day of November, 2018

Andrei Iancu
*Director of the United States Patent and Trademark Office*